United States Patent [19]
Park et al.

[11] Patent Number: 5,995,400
[45] Date of Patent: Nov. 30, 1999

[54] UNINTERRUPTIBLE POWER SUPPLY SYSTEM WITH REMOVABLE FRONT PANEL DISPLAY AND CONTROL MODULE

[75] Inventors: John N. Park; Douglas G. Caldes, both of Orlando; William B. Hawkins, III, Winter Springs; Jeffrey L. Woodard, Orladno, all of Fla.

[73] Assignee: XS Technologies, Inc., Orlando, Fla.

[21] Appl. No.: 09/129,612

[22] Filed: Aug. 5, 1998

Related U.S. Application Data

[63] Continuation of application No. 08/799,047, Feb. 10, 1997, Pat. No. 5,793,627.

[51] Int. Cl.$^6$ .............................. H02M 7/04; H02M 1/00; H02J 7/00
[52] U.S. Cl. .............................. 363/146; 363/143; 307/64
[58] Field of Search ...................................... 363/146, 143, 363/141; 307/64, 65

[56] References Cited

U.S. PATENT DOCUMENTS

| | | |
|---|---|---|
| 4,267,555 | 5/1981 | Boyd et al. . |
| 4,283,796 | 8/1981 | Hughes . |
| 4,384,790 | 5/1983 | Nakazawa . |
| 4,481,512 | 11/1984 | Tscheulin et al. . |
| 4,542,377 | 9/1985 | Hagen et al. . |
| 4,673,825 | 6/1987 | Raddi et al. . |
| 4,758,197 | 7/1988 | Bezos et al. . |
| 4,853,838 | 8/1989 | Westermann . |
| 4,856,088 | 8/1989 | Oliwa et al. . |
| 4,935,861 | 6/1990 | Johnson, Jr. et al. . |
| 4,940,414 | 7/1990 | Lee . |
| 5,134,390 | 7/1992 | Kishimoto et al. . |
| 5,185,804 | 2/1993 | Watanabe . |
| 5,189,404 | 2/1993 | Masimo et al. . |
| 5,202,585 | 4/1993 | Aoyagi et al. . |
| 5,341,434 | 8/1994 | Kawamoto . |
| 5,369,549 | 11/1994 | Kopp et al. . |
| 5,444,868 | 8/1995 | Reynolds et al. . |
| 5,450,285 | 9/1995 | Schlemmer . |
| 5,479,525 | 12/1995 | Nakamura et al. . |
| 5,533,185 | 7/1996 | Lentz et al. . |
| 5,575,544 | 11/1996 | Hasegawa et al. . |

FOREIGN PATENT DOCUMENTS

| | | |
|---|---|---|
| 4-4092 | 2/1992 | Japan . |
| 4-159593 | 6/1992 | Japan . |
| 5-80703 | 4/1993 | Japan . |
| 683571 | 3/1994 | Switzerland . |

Primary Examiner—Peter S. Wong
Assistant Examiner—Rajnikant B. Patel
Attorney, Agent, or Firm—Allen, Dyer, Doppelt, Milbrath & Gilchrist, P.A.

[57] ABSTRACT

An uninterruptible power supply (UPS) system includes a control and display module operational with a UPS when carried by a housing of the UPS and when remote from the housing. An orientation sensing switch carried by the module senses a horizontal or vertical position of the module and provides a signal to a module processor for providing performance diagnostics of the UPS in a horizontal or vertical format as appropriate. The UPS system housing includes support arms extendable from the housing for providing added stability to the housing when in a vertical position. The control and display processor receives manual input from user buttons on the module and communicates with a UPS processor carried by the housing. The UPS includes a battery positioned within the housing for access by removal of a front housing panel for avoiding movement of the UPS system during replacement of batteries.

34 Claims, 13 Drawing Sheets

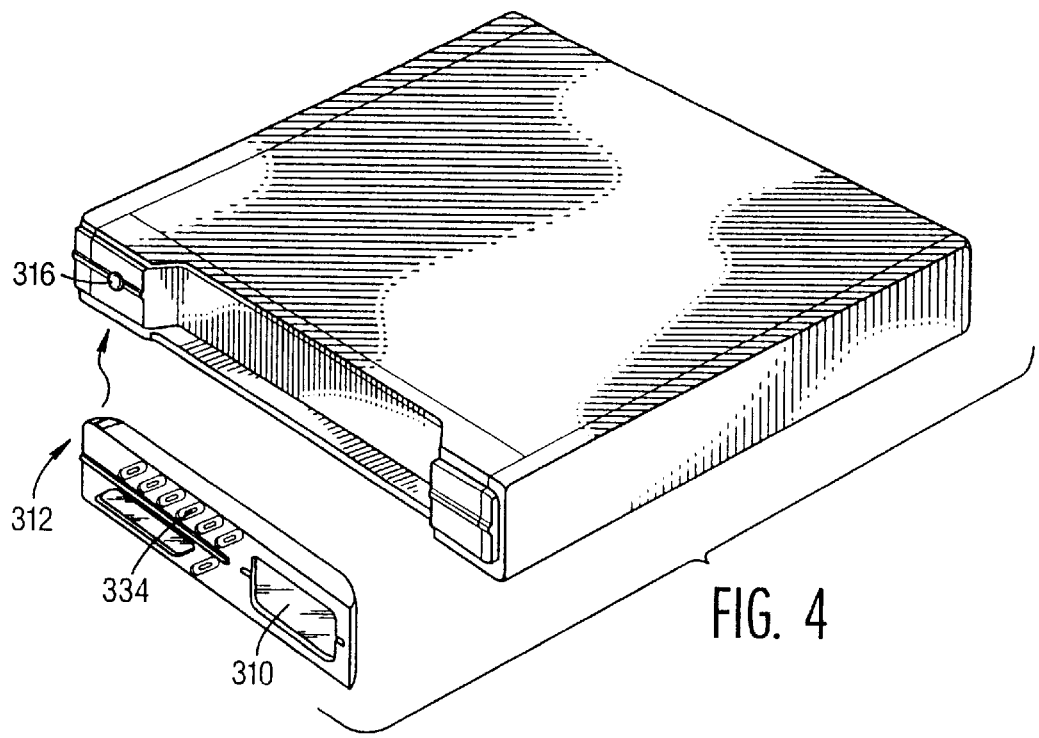
FIG. 4
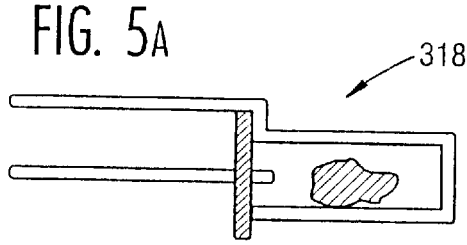
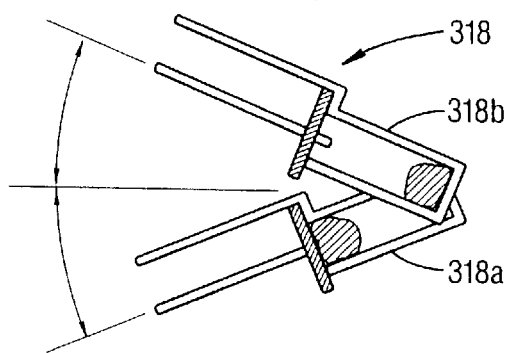

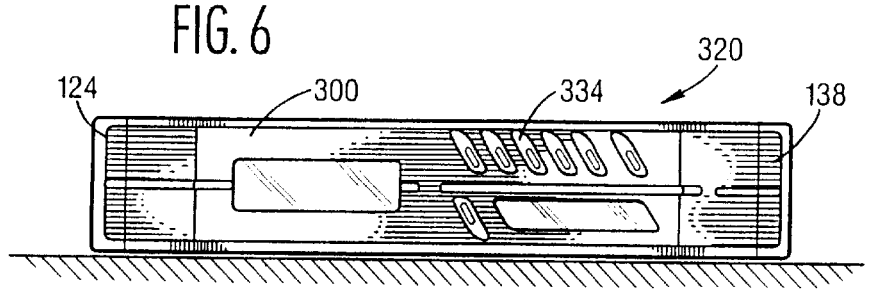
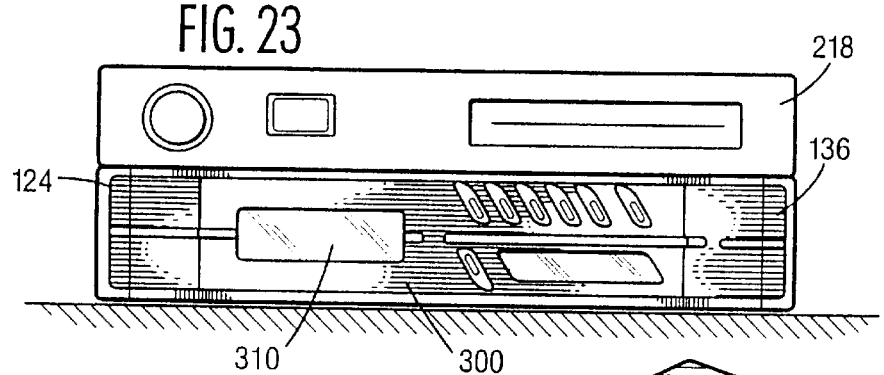
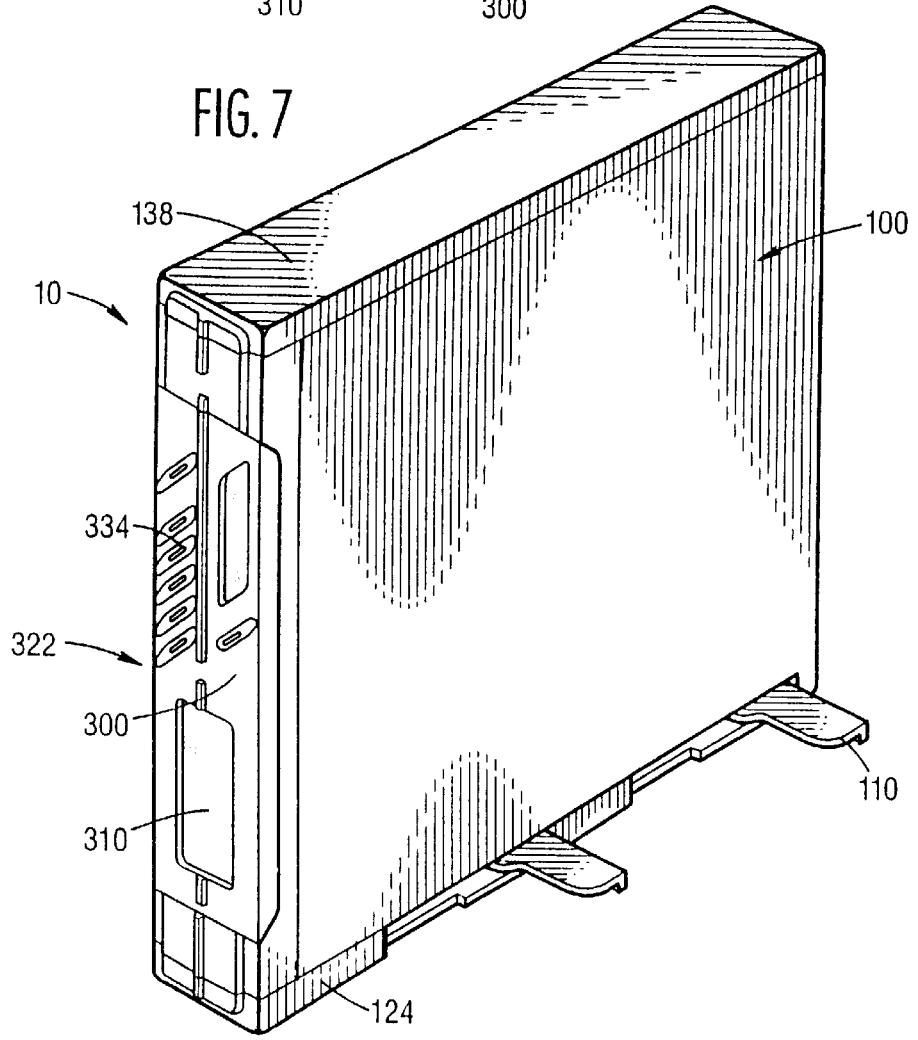

FIG. 11

| ICON | DESCRIPTION |
|---|---|
| ✶ | Diagnostics - Built in diagnostic test. |
| ⚒ | Serial Link - Shows communications between computer and UPS. |
| ⚡ | Surge protection fault - Surge protection devices damaged. |
| ⊕ | Wiring fault - Shows that house wiring is wired incorrectly. |
| ⚖ | Overload - More power demand than unit can supply. |
| ⎕ | Bypass - Running in bypass mode (running from house wiring). |
| ⊠ | Replace bat. - battery in need of replacement. |
| ▭ | On battery - running from battery. |
| ⚡ | UPS fault - UPS cannot produce power due to internal failure. |
| ∿ | Normal - normal operation. |
| ⚿ | Keypad Locked - keypad child lockout function. |

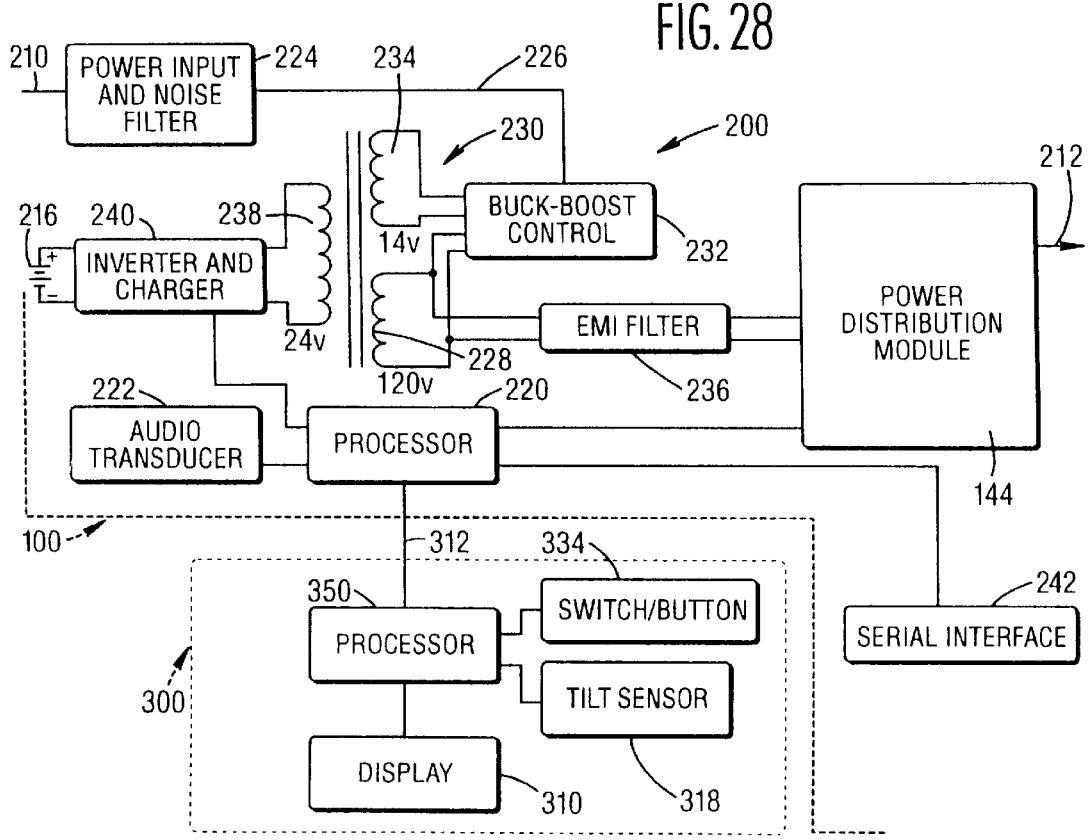
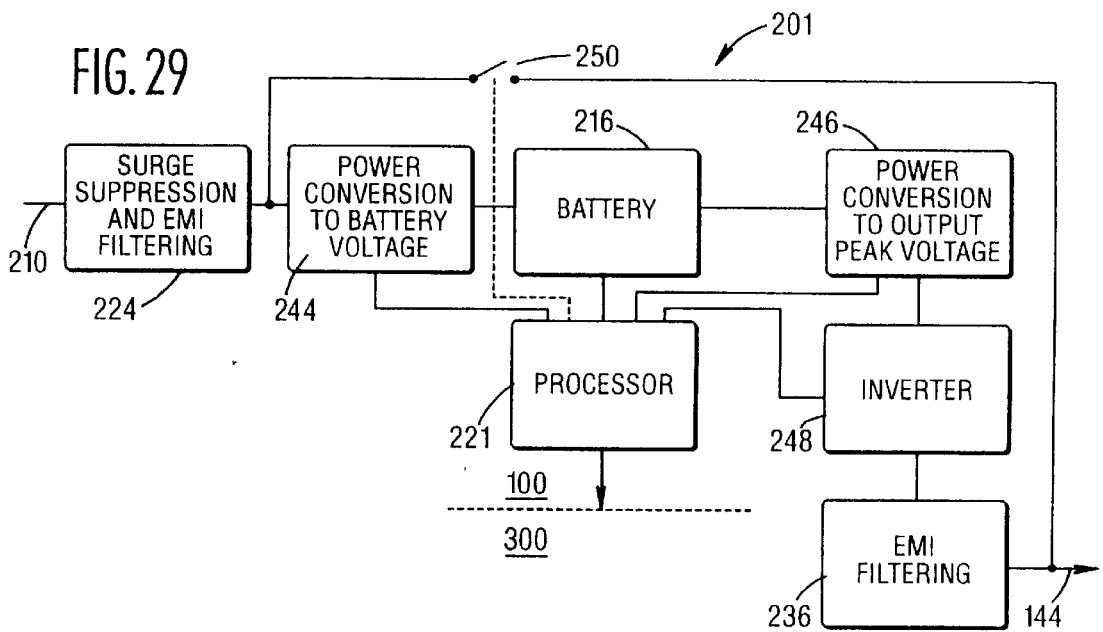

UNINTERRUPTIBLE POWER SUPPLY SYSTEM WITH REMOVABLE FRONT PANEL DISPLAY AND CONTROL MODULE

CROSS REFERENCE TO RELATED APPLICATION

This application is a continuation of application Ser. No. 08/799,047 filed Feb. 10, 1997 issuing as U.S. Pat. No. 5,793,627, all commonly owned with the present invention.

FIELD OF INVENTION

The invention relates generally to the field of emergency power sources and more particularly to an uninterruptible power supply (UPS), and the control and display of UPS operating parameters.

BACKGROUND OF THE INVENTION

An uninterruptible power supply, well known as a UPS, is typically used as a buffer between commercially supplied power and an electrical load, such as a computer, that requires precise or uninterrupted power. If line voltage varies or is interrupted, power to the load is maintained for a limited amount of time to operate the load during the interruption or to provide time to shut down the load without resulting damage. A UPS typically comprises a rectifier, inverter, and battery charger. The UPS uses the commercially supplied AC power to charge a DC battery. The computer or electronics equipment, the load, then draws its AC power from the DC battery through the DC to AC inverter using appropriate circuitry. This isolates the load from power surges or brownouts and also furnishes a source of power during brief outages.

There is an ever increasing need to protect consumer electronic products such as the computer and home entertainment equipment. Further, there is a need to integrate the UPS within the packaging style of product, and provide operational information to the consumer during normal and interrupted power operations for the consumer equipment relying on protection through the UPS.

With increasingly smaller and less expensive computer equipment, there has been an increasing emphasis on the need for smaller and less expensive UPS systems. Typically, small UPS systems are included in one of three categories; stand-by, on-line, and line interactive.

A stand-by UPS maintains its battery with a low charge rate, and only becomes active when the power source fails. Normally, power is passed from the alternating-current power source to the UPS output. Surge suppression capability is similar to a suppression power strip. All high power components are normally off, and are only used for a few minutes when the power source fails. With such an arrangement, heat build-up in the UPS is seldom a concern. On the other hand, since the UPS circuitry is only used when the power fails, a failure in the backup supply may not be noticed until backup power is needed, thus defeating the primary purpose of the UPS.

An on-line UPS converts the alternating-current power source to direct-current at the battery level, then regenerates alternating-current from the battery supply. Since the output power is being generated locally, the power source is effectively de-coupled from the UPS output, thus resulting in excellent surge suppression. Since the power generation circuitry is normally active, any failure in that circuitry is most likely to happen when the power source or main power is available. The UPS can switch back to the main power and the user can be notified that backup is not available before it is needed. Thus, there is no false sense of security as in the stand-by type systems. However, the on-line system requires a battery charge circuit with enough power to charge the battery and supply the alternating-current output under full load. Such a feature adds cost for providing the UPS system. Further, with high power components running continuously, heat build-up becomes a factor.

The line-interactive UPS is a stand-by supply that charges the battery by running alternating-current generation circuitry in reverse. It usually includes an extra winding on a power transformer that can be used to boost or cut the input voltage to keep the output voltage within a nominal range during power surges and brownouts. The line-interactive is currently popular in the small UPS market, very likely because of the lower number of component parts required for the UPS. Typically, all UPS systems must generate a sixty cycle alternating-current output, and consequently will have a relatively heavy, bulky transformer in order to operate at this frequency.

There is thus a need to provide a reliable UPS that fits within the consumer product lines including computers and home entertainment systems, and to provide such a UPS at a price that complements the products being protected.

SUMMARY OF INVENTION

In view of the foregoing background, it is therefore an object of the present invention to provide a UPS system in response to, and in satisfaction of, the aforementioned needs. It is further an object to provide an ergonomically sensitive UPS system that accommodates the varying needs of the consumer in a personal computer environment and in a home entertainment system environment.

These and other objects, advantages and features of the present invention are provided by an uninterruptible power supply system comprising a housing, an uninterruptible power supply (UPS) carried by the housing, and control and display means for communicating with the UPS in response to a manual input signal by a user. The control and display means provides a visual display indicative of UPS performance. Further, the control and display means is removably attached to the housing and includes connector means for providing an electrical connection between the control and display means and the UPS both when the control and display means is carried by the housing and when in a detached position when the control and display means is remote from the housing. It is anticipated that the UPS uses an input power source and a backup power source for providing an output power source to a load connected thereto.

It is preferred that the UPS system further include a processor carried by the housing for receiving UPS input signals indicative of UPS performance. The processor provides output signals to the UPS for effecting UPS operation. It is also preferred that the system include orientation sensing means for sensing a horizontal and a vertical orientation of the visual display. The orientation sensing means communicates with the control and display means for providing the visual display in one of a vertical format and a horizontal format responsive to the orientation.

Supporting means are carried by the housing for supporting the housing in a stable vertical orientation. The supporting means has a support arm movably from a stored position to an extended position for supporting the housing.

BRIEF DESCRIPTION OF DRAWINGS

A preferred embodiment of the invention as well as alternate embodiments are described by way of example with reference to the accompanying drawings in which:

FIG. 4 is a perspective view of an alternate embodiment of the present invention incorporating a wireless communication connection between a control and display module an a UPS carried within a housing;

FIGS. 5a and 5b are partial cross-sectional views of a wetted mercury switch used in an embodiment of the present invention;

FIG. 6 is a front elevation view of the embodiment of FIG. 1 with the control and display module attached to the housing:

FIG. 7 is a vertical arrangement of the embodiment of FIG. 1;

FIG. 11 illustrates icons displayed during operation of the invention with a brief description thereof;

FIG. 23 is a front elevation view of an alternate embodiment of the present invention displayed with home entertainment equipment;

FIG. 28 is a schematic block diagram of one electrical embodiment of the present invention illustrating operation with a line-interactive-styled UPS; and FIG. 29 is a schematic block diagram of an alternate electrical embodiment of the present invention illustrating operation with an on-line styled UPS.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
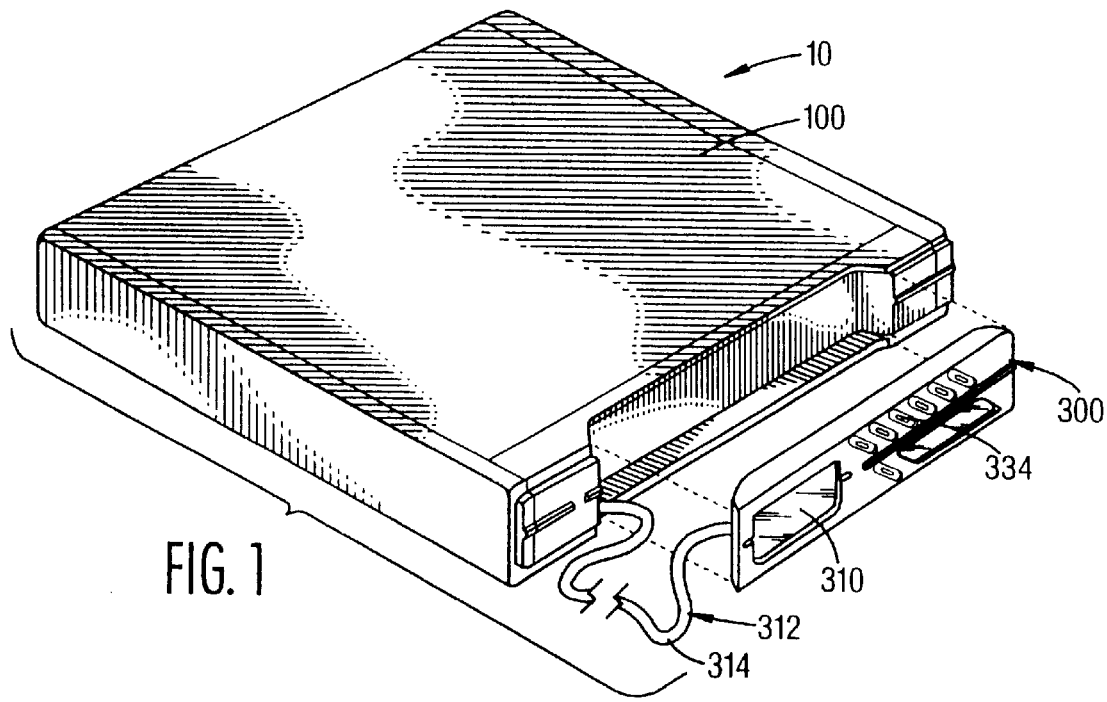
FIG. 1 is a perspective view of a preferred embodiment of a UPS system of the present invention.
Figure 2:
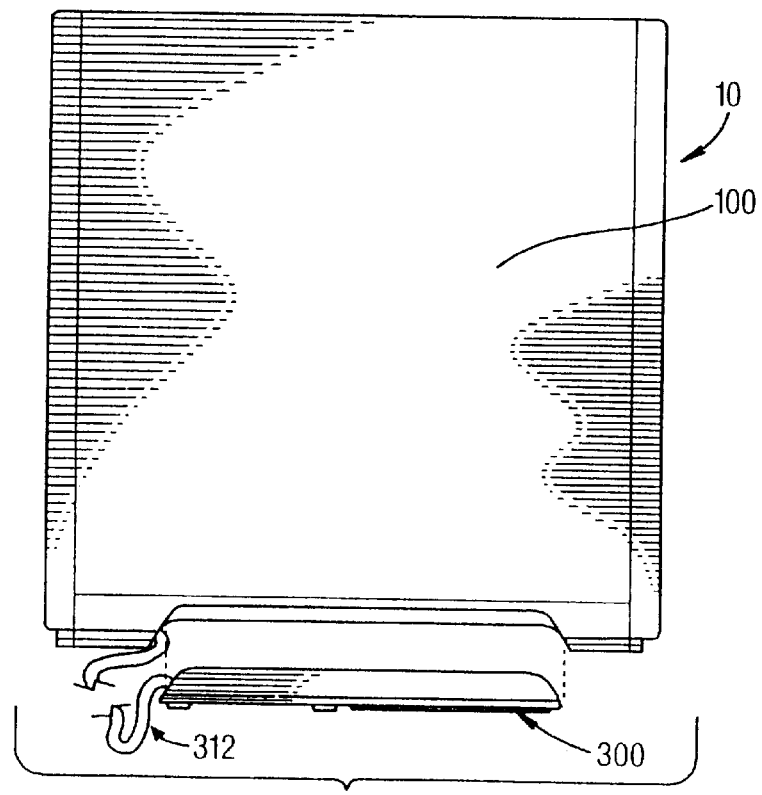
FIG. 2 is a top plan view of the embodiment of FIG. 1.
Figure 3:
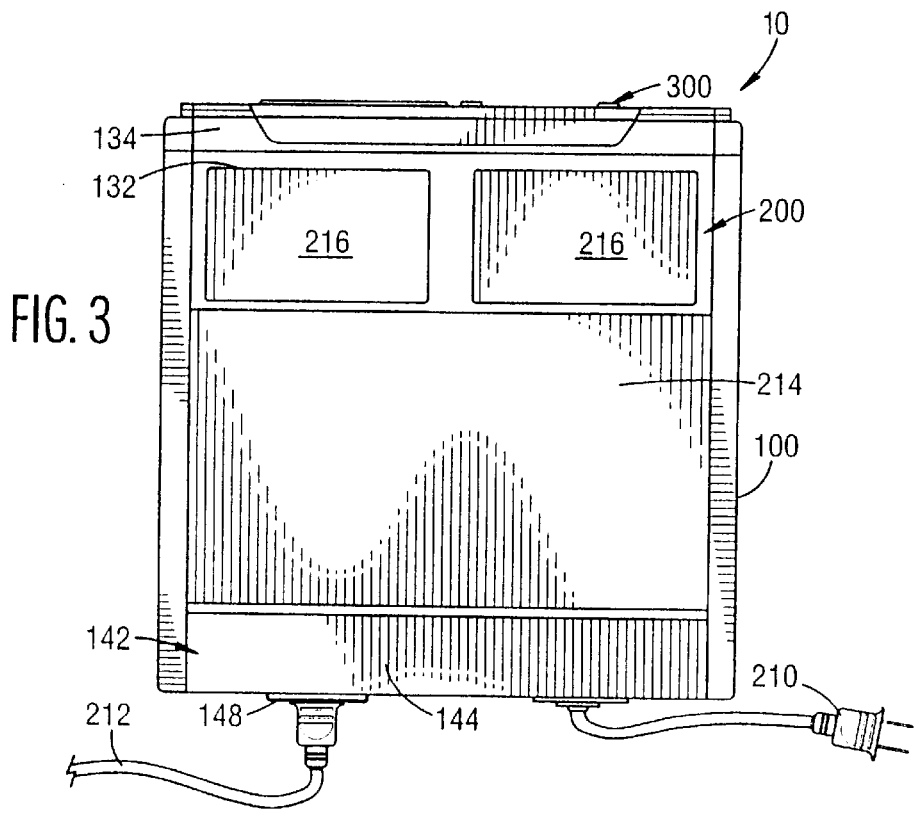
FIG. 3 is a top plan diagrammatical view of a embodiment of the present invention illustrating components thereof.

Referring now to FIGS. 1–3, the invention is first described as an uninterruptible power supply system 10 having a housing 100 which carries an uninterruptible power supply (UPS) 200 therein. The UPS 200, in a preferred embodiment of the present invention, includes access to a power source 210, which will typically be input power from a commercial power company, wherein the access to the power is through a home electrical receptacle. The UPS system 10 herein described includes a preferred embodiment useful with consumer electronics such as a personal computer or home entertainment center, but it is to be understood that alternate uses are anticipated that may include commercial electronic systems requiring a backup source of power for providing an output power source to a load 212 connected thereto. The UPS 200, in the preferred embodiment herein described, includes circuitry 214 centrally located within the housing 100, which circuitry 214 includes a UPS processor 220, as will be described later in further detail with reference to FIG. 28. The processor 220 receives UPS input signals indicative of UPS performance and provides output signals to the UPS for effecting UPS operation. As illustrated again with reference to FIGS. 1–3, control and display means are provided in a control and display module 300 for communicating with the UPS circuitry 214 in response to a manual input signal by a user. As will later be described in further detail, the control and display module 300 includes a display 310 for providing a visual display indicative of the UPS performance. A liquid crystal display (LCD) is anticipated for alternate uses. The preferred embodiment of the present invention includes the display 310 having a VFD 328 to provide wider viewing angles to better accommodate the horizontal and vertical display formats, as will be later described.

The invention further includes the module 300 removably attachable to the housing 100 with connector means 312 for providing an electrical connection between the control and display module 300 and the UPS 200. The connector means 312 provide the electrical connection both when the control and display module 300 is carried by the housing 100, as illustrated again with reference to FIG. 3, and when in a detached position wherein the control and display module 300 is remote from the housing 100, as illustrated again with reference to FIGS. 1 and 2. By way of example, the module 300 may be set on a desk top proximate the user work area, while the housing 100 is positioned on the floor away from the work area. Versatility for use of the system 10 is thus achieved. It is anticipated that the connector means 312 be embodied in a wire lead 314 connected between the control and display module 300 and the UPS processor 214, as illustrated again with reference to FIGS. 1 and 2, or in an alternative as a wireless connection 316 as illustrated by way of example with reference to FIG. 4. The wire lead 314 will include both copper and optical wire as is well known in the art. Further, the wireless connection 316 will include infrared and RF styled system connections, also well known in the art.

Figure 8:
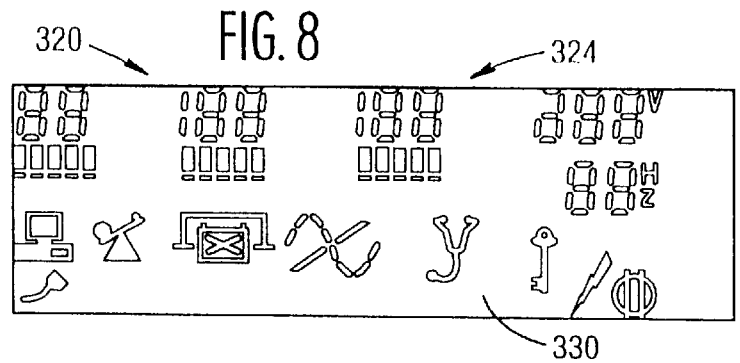
FIG. 8 is a partial display illustrating icons viewed within a horizontal display format.
Figure 9:
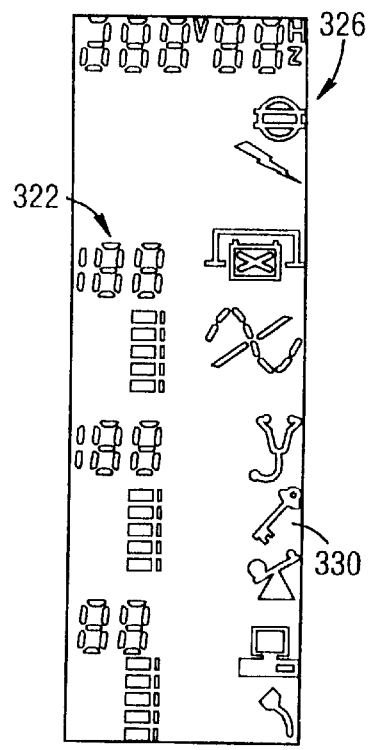
FIG. 9 is a partial display illustrating icons viewed within a vertical display format.
Figure 10:
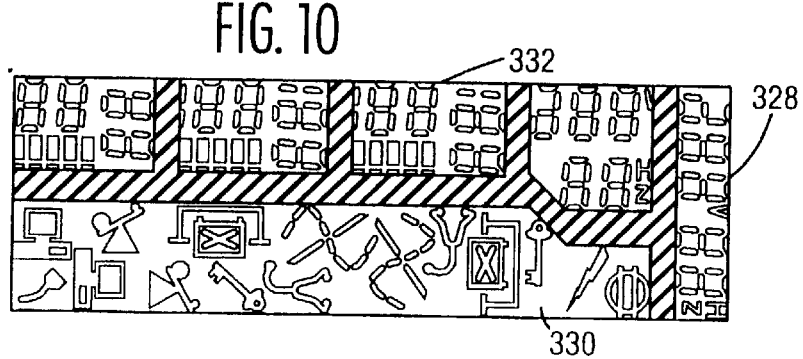
FIG. 10 is a plan view of a display graphics layout illustrating both horizontal and vertical display elements.

In one preferred embodiment of the present invention, the module 300 further includes orientation sensing means in the form of a mercury wetted switch 318, as illustrated with reference to FIGS. 5a and 5b for sensing a horizontal orientation 320 of the module 300, and a vertical orientation 322 of the module 300 and thus the display 310, as illustrated by way of example with reference to FIGS. 6 and 7, wherein the module 300 is attached to the housing 100. The mercury wetted switch 318 is set, by way of example, at a 45 degree angle. When the user tips the display past 45 degrees, an input to the module processor, to be described later in further detail, closes and the display 310 is changed to the vertical format 326. If the user returns the display 310 back toward horizontal, the mercury switch opens up, and the processor changes the display to horizontal format 324. Thus the orientation sensing switch 318 provides a signal to the control and display module electronics, for providing the display 310 in one of a horizontal format 324 and a vertical format 326 responsive to the orientations 320, 322, respectively, as illustrated with reference to FIGS. 8 and 9. As illustrated with reference to FIG. 10, the vacuum fluorescent display (VFD) 328 includes multiple icons 330 and digital alphanumerics 332 which are selected by module electronics in response to the orientation 320, 322 for providing the appropriate format 324, 326. Each icon 330 represents UPS performance information to the user as illustrated by way of example with reference to FIG. 11. User input is manually provided through switches having push button 334 for providing a manual input signal.

Figure 12:
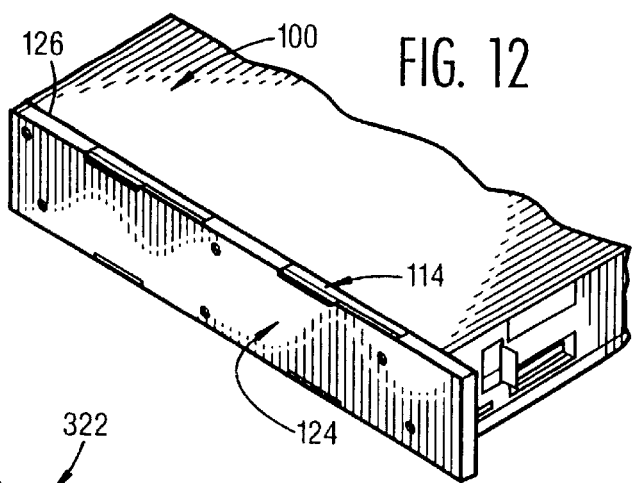
FIG. 12 is a partial perspective view of a housing side panel.
Figure 13:
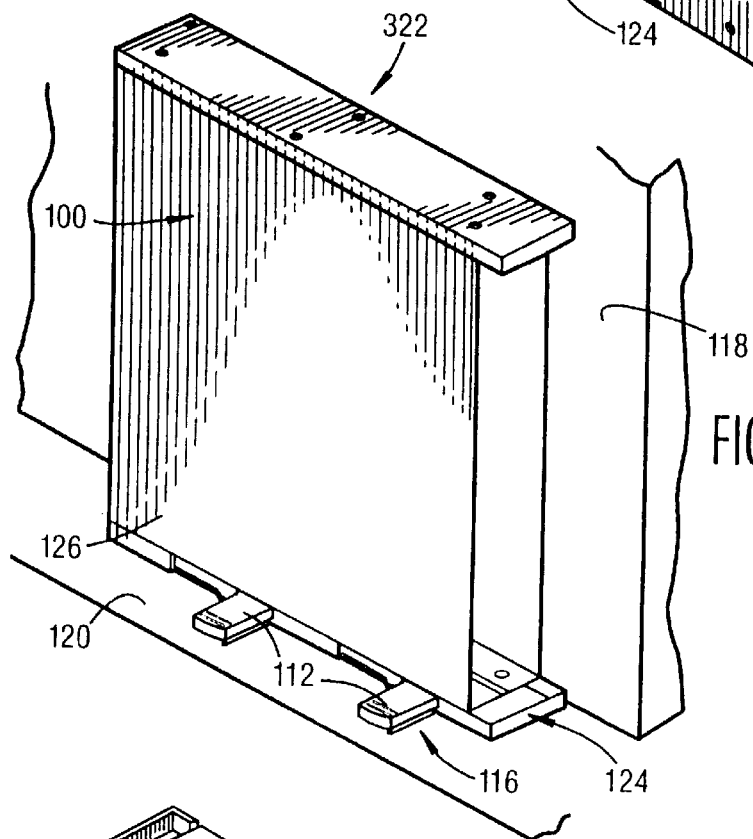
FIG. 13 is a perspective view of a housing in a vertical position illustrating independent operation of support arms.
Figure 14:
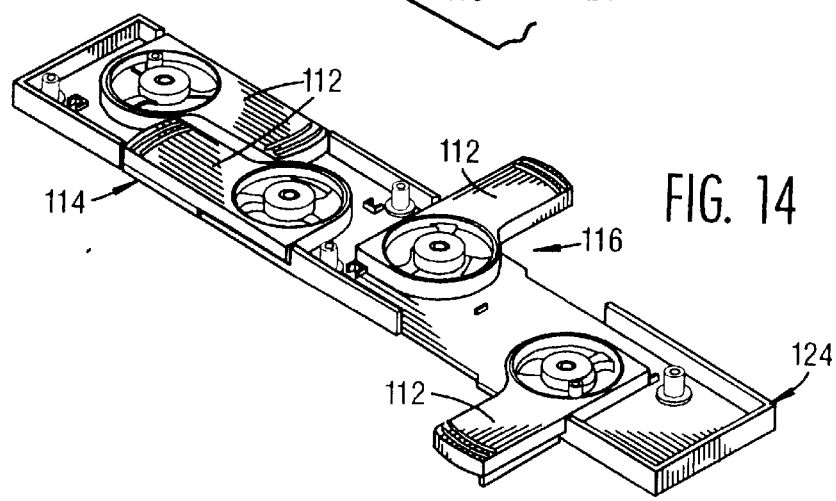
FIG. 14 is a perspective view of one embodiment of a support panel.
Figure 15:
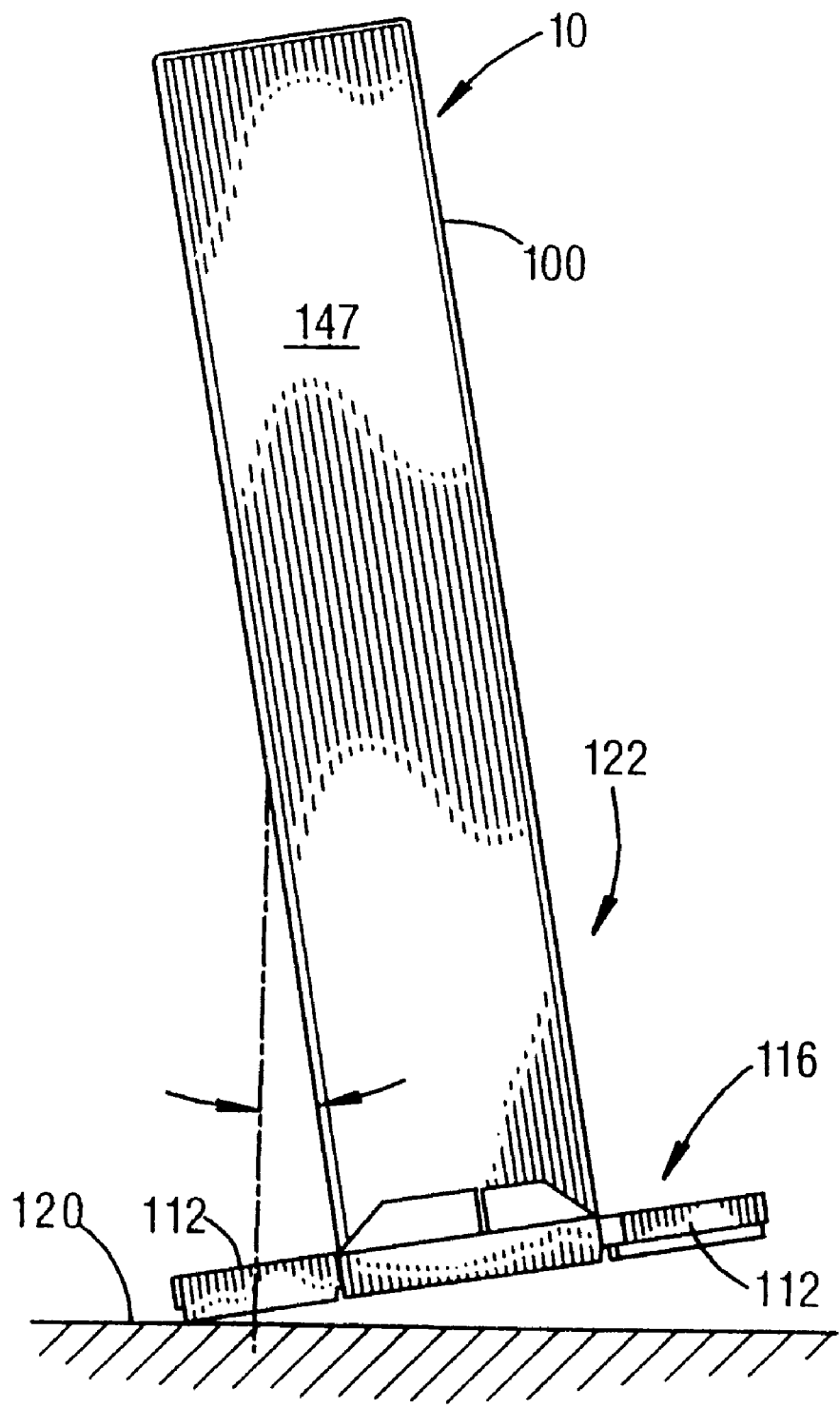
FIG. 15 is a partial end view of the housing illustrating a stabilizing feature with support arms extended.

As illustrated again with reference to FIG. 7, supporting means 110 are carried by the housing 100 for supporting the housing 100 with more stability in the vertical orientation 322. As will be described later in more detail, the supporting means 110 includes a support arm 112 acting as feet movably from a stored position 114 to an extended position 116 for supporting the housing 100, as illustrated with reference to FIGS. 12–14. In one preferred embodiment of the present invention, as illustrated again with reference to FIGS. 13 and 14, multiple support arms 112 include each arm 112 independently movable from its stored position 114 to the supporting or extended position 116. With such an arrangement, the support means 110 is adaptable for use, by way of example, against a wall 118. As illustrated with reference to FIG. 15, the arms 112 extend outward from the housing 100 along a support surface 120 upon which the system 10 is placed sufficient to limit tipping of the system 10 within established standards. By way of example, well known standards include a requirement that the system 10 not be overbalanced when tilted to an angle orientation 122 of ten degrees from its normal upright or vertical orientation 322. Further, under conditions of normal use, the system 10 will not become physically unstable to the degree that it could become a hazard to users. The equipment carried within the housing 100 and the length dimension of the arms 112 allow for such standards. It is anticipated that when varying the configuration of various embodiments that come to the mind of those skilled in the art, length dimensions for the arm 112 and positioning of equipment carried by the housing 100 will be such that a "tilt standard" can be easily met.

Figure 16:
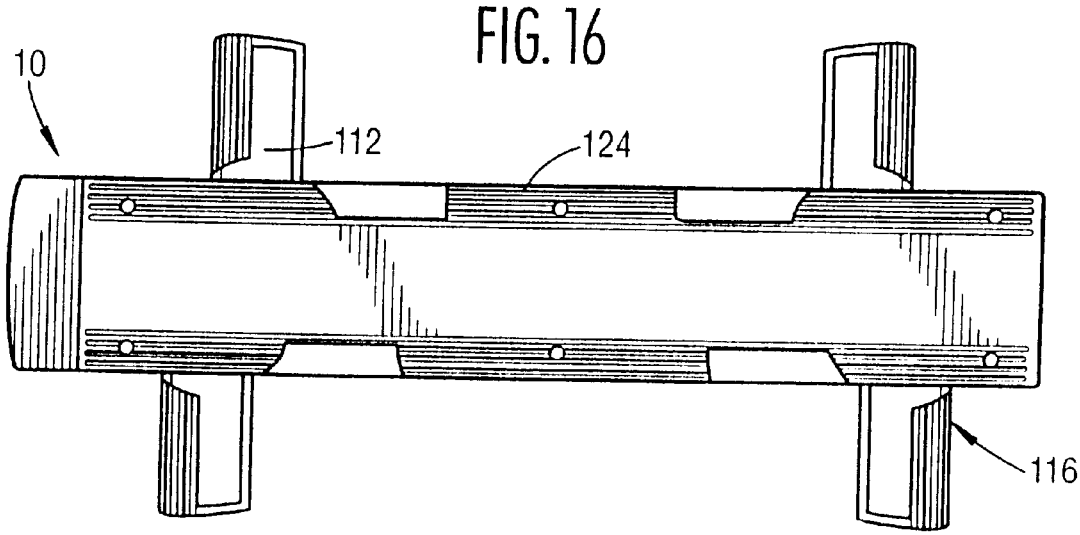
FIGS. 16–21 are plan views of alternate embodiments of housing supports illustrated within extended arm and stored arm positions.
Figure 17:
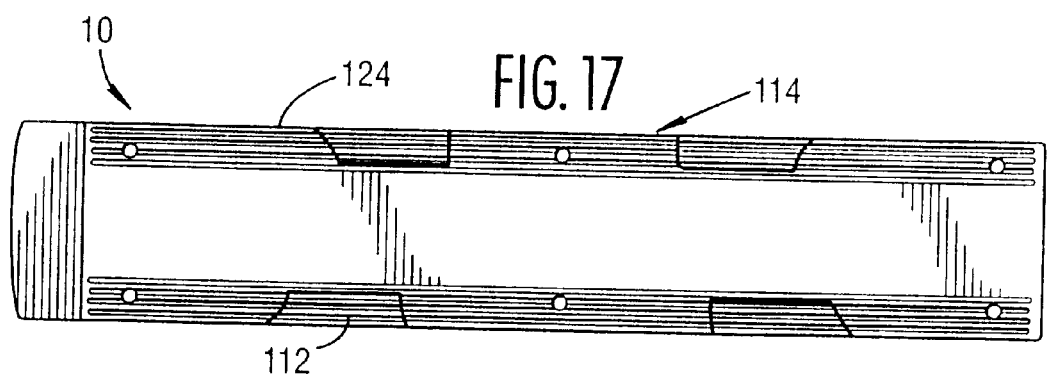
Figure 18:
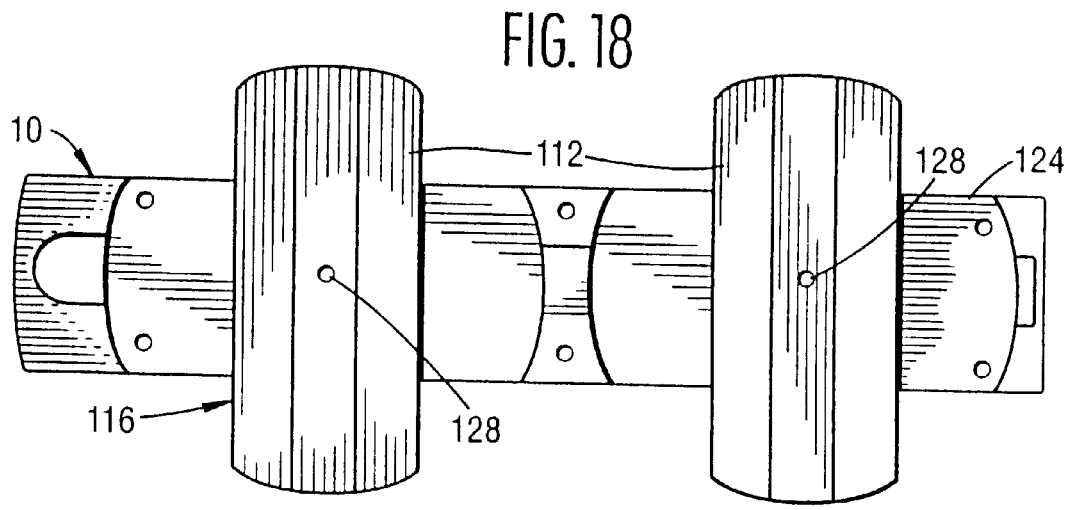
Figure 19:
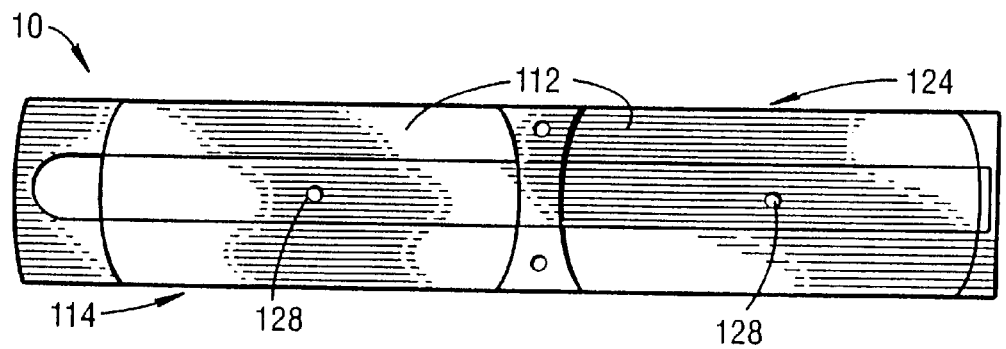
Figure 20:
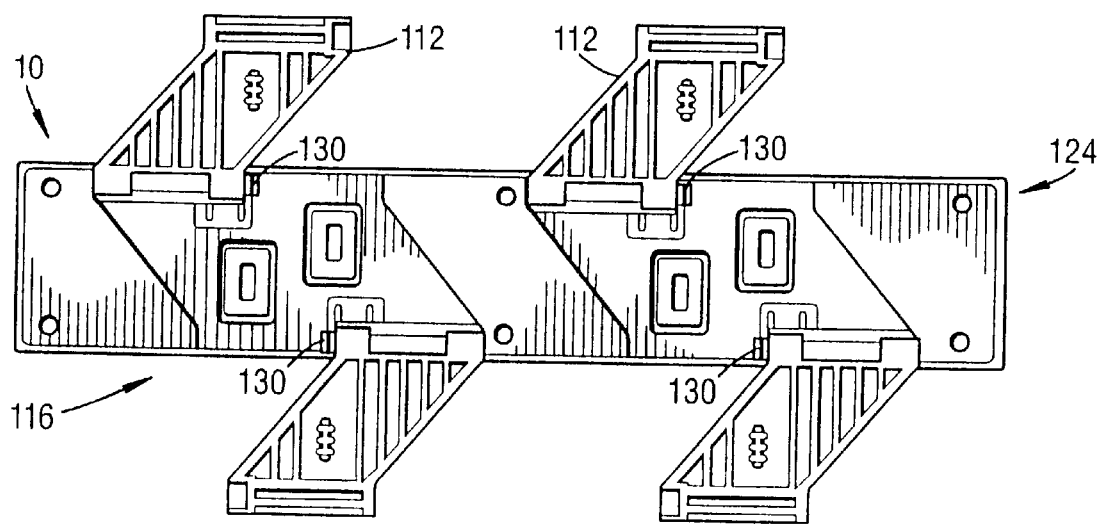
Figure 21:
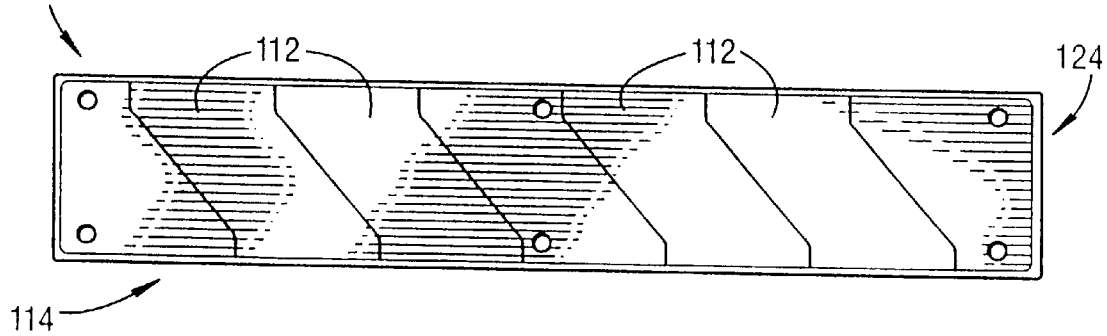

As illustrated again with reference to FIGS. 12 and 13, the support means 110 for one preferred embodiment of the present invention, includes a hollow panel 124 for attachment to a housing side portion 126. The support arms 112 are then rotatably carried by the panel 124 for rotation into the panel 124 for the stored position 114 and rotation out of the panel 124 for the extended position 116. Such is the case in the alternate embodiment, as illustrated with reference to FIGS. 16 and 17. In yet other embodiments of the support means 110, as illustrated with reference to FIGS. 18 and 19, arms 112 pivot about a central arm portion 128 for movement and indeed rotation into and out of the stored position 114 and extended position 116. In yet another embodiment of the support means 110, the panel 124 is attached to a housing side portion 126, as earlier described, and the support arms 112 are carried by the panel 125 using hinges 130 for movement from the stored position 114 to the extended position as 116, as illustrated with reference to FIGS. 20 and 21. As illustrated again with reference to FIGS. 16–21, each embodiment of the support means 110 accommodates use during both the vertical orientation 322 and the horizontal orientation 320, when in the arm stored position 114 of the system 10.

Figure 22:
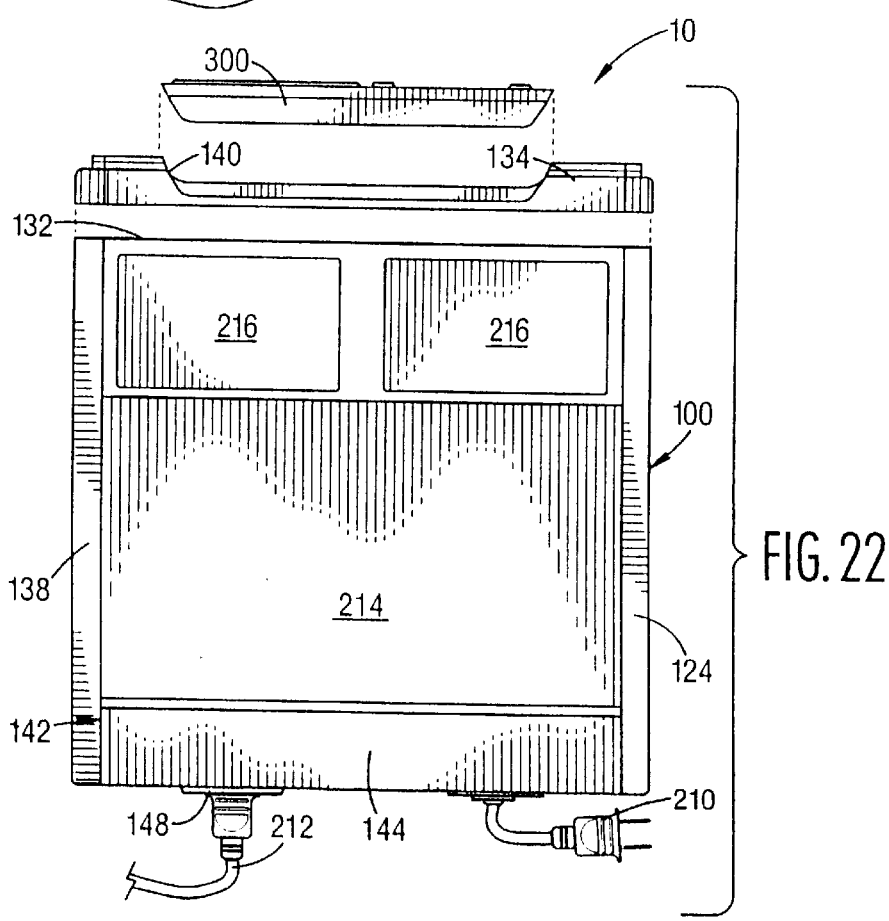
FIG. 22 is an exploded view of FIG. 3.

With reference to FIG. 22, and again to FIG. 3, the housing 100 further includes a front portion 132 adapted for carrying a batteries 216 of the UPS 200. A face plate 134 is removably attached to the housing front portion 132 for providing access to the batteries 216 for convenient insertion and removal of the batteries 216 by a user without having to relocate or reposition the system 10. This is particularly helpful when the system 10 is being used to protect home entertainment equipment 218 such as a VCR and the like that have been stacked on the system 10, as illustrated by way of example with reference to FIG. 23. To further accommodate such an arrangement, alternate housing side panels 136 having varied width dimensions are added to the housing 100 for providing a pleasing appearance when used with the home entertainment equipment 218, and may replace the panel 124, earlier described, or the opposing housing side panel 138.

Figure 24:
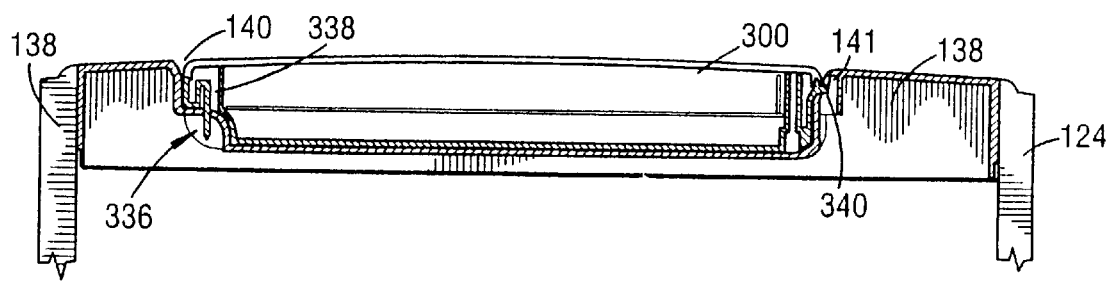
FIG. 24 is a partial cross-sectional view of the module within a housing face plate.
Figure 25:
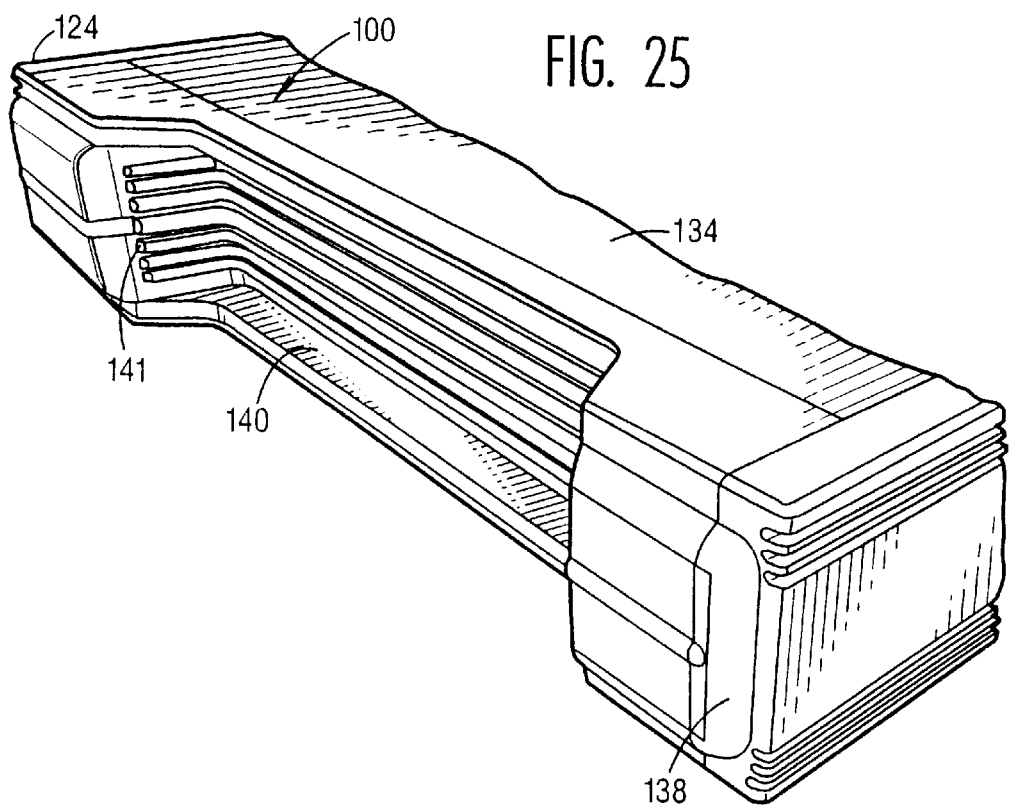
FIG. 25 is a partial perspective view of the housing face plate illustrating a concave well.

In a preferred embodiment of the system 10, the face plate 134 includes a concave portion or well 140 for receiving the control and display module 300 therein, as further illustrated with reference to FIGS. 24 and 25. The display module 300 is thus readily detachable by a user from the housing 100 for use in an attached position with the housing or a position detached from the housing, as illustrated with reference again to FIGS. 1 and 2. The module 300 includes attachment means 336 adapted for removable attachment of the module 300 to the housing 100 within the well 140 of the housing face plate 134. As illustrated again with reference to FIGS. 24 and 25, in one embodiment of the system 100, herein described, the attachment means 336 includes a latch 338 extending from the face plate 134 (in an alternative may extend from the module 300) within the well 140 for holding to one end of the module 300. An opposing end of the module 300 includes tabs or ribs 340 which are received within grooves within the well wall portion 141, again as illustrated with reference to FIGS. 24 and 25. Depending on the exact form of the module 300 employed, it is anticipated that alternate attachment methods will be employed, such as with the use of clips or Velcro. The present embodiment, herein described, provides for access to the latch 338 from the rear of the face plate 134 after the face plate 134 has been removed as earlier described with reference to FIG. 22. With such, It purposely becomes difficult for a child to remove the module 300 once a particular system orientation and arrangement is selected by the user.

Figure 26:
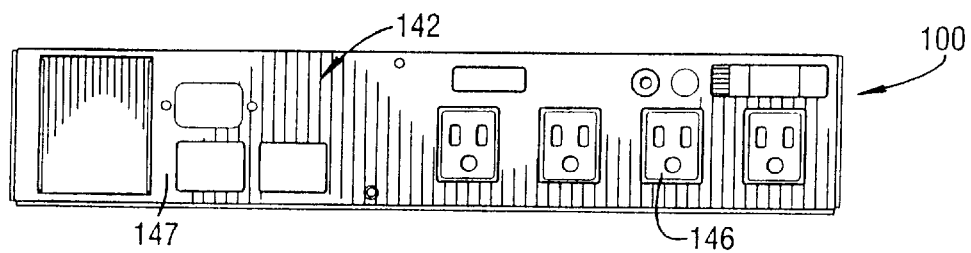
FIG. 26 is a partial plan view of a rear face of the housing illustrating a power distribution module face plate.
Figure 27:
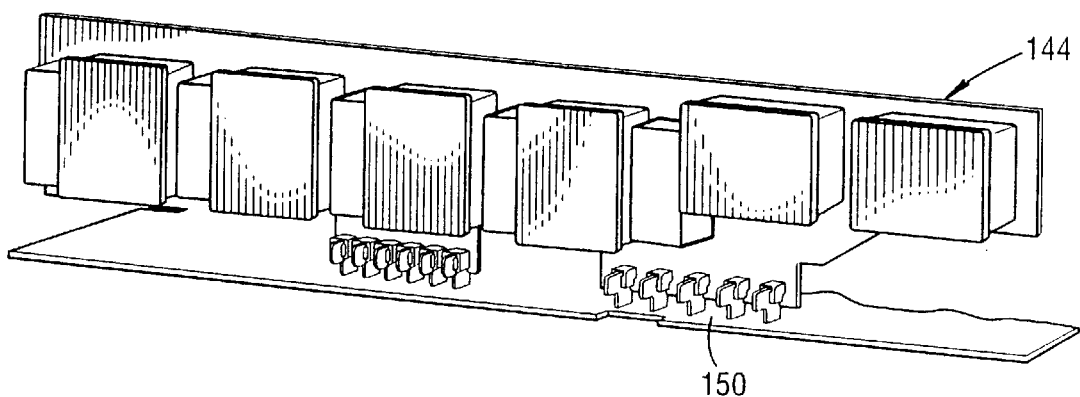
FIG. 27 is a partial perspective view of a power distribution module.

Again with reference to FIGS. 3 and 22, the housing 100 further includes a rear portion 142 adapted for carrying a power distribution module 144 for electrical connection to the load 212 as earlier described. In a preferred embodiment of the system 10, the power distribution module 144, as illustrated with reference to FIGS. 26 and 27, includes a plurality of connectors 146, including receptacles 148 for providing connection to the load 212, from a housing rear plate 147. The power distribution module 144 includes contact pins or clips 150 for providing electrical connection to the UPS electronics and for removably securing the module 144. With such an arrangement, alternate modules, by way of example having an European receptacle standard can easily be installed during system 10 fabrication. This also increases the reliability of the unit by removing cable assemblies typically used in the art.

In alternate embodiments of the system 10, it is anticipated that an alternate UPS 200 will be used to accommodate the particular preference of the user. By way of example, a standby styled UPS and an on-line UPS are herein described for use in the above described system 10.

Common to any UPS 200 used in a preferred embodiment of the system 10 is the control and display module 300 earlier described. With reference to FIG. 28, the module 300 includes inputs from user buttons 334, orientation sensor or mercury switch 318, and a link to the UPS 200 through a link or connector means 312. Outputs from the control and display module 300 include the visual display 310, as earlier described, and as is preferred, an audio output signal. Further output is to the UPS 200 through the connector means 312. The module 300 further includes a processor 350 which reads and inputs from the user buttons 334 and sends the information through the connector means 312 to a main unit data link 312, then to a UPS processor 220. As button presses are detected, audible feedback is provided through an audio transducer 222.

The module processor 350 controls the UPS and periodically receives UPS performance status information from the processor 220 through the main unit data link 312, which is stored for display updates.

The display 310 is refreshed on a periodic basis from information stored in the processor 220. Input from the tilt or orientation sensor 318 is used to determine whether to display the information in the vertical or horizontal format 326, 324, earlier described with reference to FIGS. 8 and 9.

Consider the line-interactive UPS 200, again with reference to FIG. 28. Power 210 enters the UPS 200 and passes through a surge suppression and filtering network 224. The resulting power 226 is passed to a 120 V coil 228 on the transformer 230, via a Buck/Boost control 232, where a 14 V coil 234 is used to add or subtract to line voltage, or bypassed altogether.

The 120 V coil 228 is passed through an EMI filter 236, then to the output power distribution module 144 where it is delivered to the load 212 through a relay (not shown). The relays allow independent control of multiple loads.

While the input power 210 is active, the transformer 230 transfers power from right to left, as illustrated with reference again to FIG. 28, into a 24 V coil 238. Power from this coil 238 is delivered to an inverter/charger 240 where it is rectified and used to charge the battery 216.

When the main power input 210 fails, the inverter/charger 240 converts the battery voltage to alternating current(AC). AC voltage is supplied to the 24 V coil 238 on the transformer 230, which transfers power from left to right, into the 120 V coil 228. As before, the power is filtered and passed to the output module 144 for distribution to the connected load(s) 212.

Typically, standby UPS processor 220 includes inputs of Main Input Voltage, Main Input Voltage Zero Crossing Detect, Output Voltage, Output Load, Battery Voltage, Control/Display Module Data Link, and Serial Port Data Link. Output will include Inverter PWM (Pulse Width Modulation), Charger PWM, Buck/Boost Relay Drivers, Output Relay Drivers, Audio Transducer, Control/Display Module Data Link, and Serial as Port Data Link.

In operation, the UPS processor 220 monitors the Control/Display module processor 350 through the data link 312 for user inputs to decide the On/Off status of the unit and the multiple loads attached. It controls relays in the output module 144 to direct power to the loads 212 as requested. The UPS processor 220 also monitors the Main Input Voltage Zero Crossing detect, and counts the time between detection to determine the frequency and stability of the Main Input. It uses this information, plus the Main Input Voltage value to determine if the Main Input is suitable to power the attached load. If the input frequency is stable and in the appropriate range, but the input voltage is too high or too low, the processor 220 can control the boost/buck relays 232 to compensate the output voltage (which is also monitored).

As long as the power input 210 is acceptable, the processor 220 monitors the battery voltage and controls the amount of power that the inverter/charger 240 delivers to the battery 216.

When the input power 210 falls out of the acceptable range, the processor 220 drives the inverter section 240 in such a way as to deliver 24VAC power to the transformer 230. The amount of power delivered is controlled to keep the output voltage in the acceptable range. If the power delivered to the load 212 exceeds the rating for the supply, or the output voltage falls out of the acceptable range, the operator is informed via an audio transducer in the unit.

Throughout the normal operation of the system 10, status is sent to the control/display module processor 350 and a serial port data link 242 for communication, by way of example with a personal computer.

With reference now to FIG. 29, consider the operation of an on-line UPS 201. Source or input power 210 enters the UPS 201 and passes through the surge suppression and filtering network 224, as earlier described. The resulting power enters a power conversion block 244 which converts the AC voltage to DC at the battery voltage. This conversion block 244 consists of a rectifier, high frequency switching power supply, and optionally a power factor correction stage. Power from this point is used to supply the battery 216 and the output power conversion block 246. The DC power at this point both charges the battery and supplies the output power.

The output power conversion block 246 converts the battery voltage to the peak voltage of the output, DC. This output conversion block 246 consists of a high frequency DC-DC converter. The power then passes to a DC-AC inverter 248. Here, the DC voltage is chopped to produce an AC sine wave. After this point, the power passes through a filter 236, as above described, to remove any high frequency noise generated in the conversion process, then on to the power output module 144 where power is supplied to the load(s) 212 through relays. If the source input power 210 fails, the power continues as before, drawing power from the battery 216 instead of the input power conversion block 244. In the event of output circuitry failure, power can be bypassed around the active electronics via the static bypass switch 250.

For such a UPS 201, inputs to the processor 221 will typically include Main Input Voltage, Main Input Voltage Zero Crossing Detect, Output Voltage, Output Load, Battery Voltage, Temperature Sensor, Control/Display Module Data Link, and Serial Port Data Link. Outputs will include Input Power Conversion Network Control PWM, Output Power Conversion Network Control PWM, DC-AC Inverter Control PWM, Fan Control PWM, Output Relay Drivers, Audio Transducer, Control/Display Module Data Link, and Serial Port Data Link.

In operation, the processor 201 monitors the Control/Display module processor 350 for user inputs to decide the On/Off status of the unit and the multiple loads 212 attached. It controls relays in the output module 144 to direct power to the loads 212 as requested. The processor 221 also monitors the Main Input Voltage Zero Crossing detect, and counts the time between detection to determine the frequency of the Main Input. It uses this information, plus the Main Input Voltage value to determine set points for the output voltage and frequency. As long as the source input power 210 is acceptable, the processor 221 monitors the battery 216 voltage and controls the amount of power that the power conversion module delivers to the battery and the output power conversion module 246. The battery charge current is controlled by small adjustments to the voltage that the battery sees. The processor 221 further monitors the output voltage and adjusts the output of the output power conversion block to maintain the desired output voltage. The processor 221 controls the AC-DC inverter by generating a high frequency PWM signal with an envelope of the desired output frequency for driving the power devices in the inverter. If the power delivered to the load 212 exceeds the rating for the supply, or the output voltage falls out of the acceptable range, the operator is informed via an audio transducer in the unit. If the main input voltage is acceptable, the static bypass switch 250 is closed to bypass the UPS battery and electronics.

The processor 221 monitors the heat generated by the power circuitry through a temperature sensor input. This information is used to control the speed of a cooling fan, running faster at high temperatures, and slower (and quieter) at low temperatures. If abnormal heating is detected, the processor can shut down the power conversion blocks and close the static bypass switch before the unit reaches destructive temperatures.

As earlier described, throughout the normal operation of the unit, status is sent to the control/display module processor 350 and the serial port data link 242.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and alternate embodiments are intended to be included within the scope of the appended claims.

That which is claimed is:

1. An uninterruptible power supply system comprising:
    a housing;
    an uninterruptible power supply (UPS) carried by the housing;
    a display module communicating with the UPS for providing a visual display indicative of the UPS performance, the display module being readily attachable to and removable from the housing; and
    an orientation sensor for sensing a horizontal and a vertical orientation of the visual display, the orientation sensor communicating with the display module for providing the visual display in one of a vertical format and a horizontal format responsive to the orientation.

2. The UPS system according to claim 1, further comprising a UPS processor carried by the housing and operable with the UPS for receiving UPS signals indicative of UPS performance and for effecting UPS operation.

3. The UPS system according to claim 1, wherein the housing comprises:
    a front portion adapted for carrying a battery therein; and
    a face plate removably attached to the housing front portion, wherein removal of the face plate provides access to the battery for insertion and removal thereof.

4. The UPS system according to claim 3, wherein the face plate comprises a concave portion for receiving the display module therein.

5. The UPS system according to claim 1, wherein the housing comprises:
    a rear portion adapted for carrying a power distribution module for electrical connection to a load; and
    a power distribution module having a plurality of receptacles for providing connection to load connectors, the power distribution module having contact pins for providing electrical connection to the UPS.

6. The UPS system according to claim 1, wherein the display module comprises a control and display processor communicating with the UPS, the control and display processor receiving the manual input signal for delivery to the UPS, the control and display processor receiving a UPS output signal for providing the visual display, the control and display processor responsive to the orientation sensor for providing the visual display in the format responsive to the visual display orientation.

7. The UPS system according to claim 1, wherein the orientation sensor is carried by the display module.

8. The UPS system according to claim 1, wherein the orientation sensor comprises a mercury switch for providing a first signal indicative of the horizontal display orientation, and a second signal indicative of the vertical display orientation.

9. The UPS system according to claim 1, further comprising a support carried by the housing for supporting the housing in a stable orientation, the support movable from a stored position to an extended position.

10. The UPS system according to claim 9, wherein the support comprises:
    a hollow panel; and
    a support arm rotatably carried by the hollow panel for rotation into the hollow panel for the stored position and rotation out of the panel for the extended position.

11. The UPS system according to claim 9, wherein the support is hingedly carried by the housing for movement from the stored position to the extended position.

12. The UPS system according to claim 9, wherein the support comprises multiple support arms, each arm independently movable from its respective stored position to the extended position, the extended position including each arm orientated outward from the housing along a support surface upon which the housing is placed.

13. The UPS system according to claim 1, further comprising electrical connecting means for providing an electrical connection between the display module and the UPS, the electrical connecting means providing the electrical connection when the display module is attached to the housing and when the display module is detached from the housing.

14. An uninterruptible power supply system comprising:
    a housing;
    an uninterruptible power supply (UPS) carried by the housing; and
    a display module communicating with the UPS for providing a visual display indicative of the UPS performance, the display module being readily attachable to and removable from the housing.

15. The UPS system according to claim 14, further comprising an orientation sensor for sensing a horizontal and a vertical orientation of the visual display, the orientation sensor communicating with the display module for providing the visual display in one of a vertical format and a horizontal format responsive to the orientation.

16. The UPS system according to claim 15, wherein the orientation sensor is carried by the display module.

17. The UPS system according to claim 15, wherein the orientation sensor comprises a mercury switch for providing a first signal indicative of the horizontal display orientation, and a second signal indicative of the vertical display orientation.

18. The UPS system according to claim 14, further comprising a UPS processor carried by the housing and operable with the UPS for receiving UPS signals indicative of UPS performance and for effecting UPS operation.

19. The UPS system according to claim 14, wherein the housing comprises:

a front portion adapted for carrying a battery therein; and a face plate removably attached to the housing front portion, wherein removal of the face plate provides access to the battery for insertion and removal thereof.

20. The UPS system according to claim 19, wherein the face plate comprises a concave portion for receiving the display module therein.

21. The UPS system according to claim 14, wherein the housing comprises:

a rear portion adapted for carrying a power distribution module for electrical connection to a load; and a power distribution module having a plurality of receptacles for providing connection to load connectors, the power distribution module having contact pins for providing electrical connection to the UPS.

22. The UPS system according to claim 14, wherein the display module comprises a control and display processor communicating with the UPS, the control and display processor receiving the manual input signal for delivery to the UPS, the control and display processor receiving a UPS output signal for providing the visual display, the control and display processor responsive to the orientation sensor for providing the visual display in the format responsive to the visual display orientation.

23. The UPS system according to claim 14, further comprising a support carried by the housing for supporting the housing in a stable orientation, the support movable from a stored position to an extended position.

24. The UPS system according to claim 14, further comprising electrical connecting means for providing an electrical connection between the display module and the UPS, the electrical connecting means providing the electrical connection when the display module is attached to the housing and when the display module is detached from the housing.

25. An uninterruptible power supply system comprising:

a housing;

an uninterruptible power supply (UPS) carried by the housing;

a visual display communicating with the UPS for providing a visual indication of the UPS performance; and an orientation sensor for sensing a horizontal and a vertical orientation of the visual display, the orientation sensor communicating with the visual display for providing the visual display in one of a vertical format and a horizontal format responsive to the orientation.

26. The UPS system according to claim 25, further comprising a UPS processor carried by the housing and operable with the UPS for receiving UPS signals indicative of UPS performance and for effecting UPS operation.

27. The UPS system according to claim 25, wherein the housing comprises:

a front portion adapted for carrying a battery therein; and a face plate removably attached to the housing front portion, wherein removal of the face plate provides access to the battery for insertion and removal thereof.

28. The UPS system according to claim 27, further comprising a display module carrying the visual display, and wherein the face plate comprises a concave portion for removably receiving a display module therein, the display module being readily attachable to and removable from the housing.

29. The UPS system according to claim 28, wherein the display module comprises a control and display processor communicating with the UPS, the control and display processor receiving the manual input signal for delivery to the UPS, the control and display processor receiving a UPS output signal for providing the visual display, the control and display processor responsive to the orientation sensor for providing the visual display in the format responsive to the visual display orientation.

30. The UPS system according to claim 28, further comprising electrical connecting means for providing an electrical connection between the display module and the UPS, the electrical connecting means providing the electrical connection when the display module is attached to the housing and when the display module is detached from the housing.

31. The UPS system according to claim 28, wherein the orientation sensor is carried by the display module.

32. The UPS system according to claim 25, wherein the housing comprises:

a rear portion adapted for carrying a power distribution module for electrical connection to a load; and a power distribution module having a plurality of receptacles for providing connection to load connectors, the power distribution module having contact pins for providing electrical connection to the UPS.

33. The UPS system according to claim 25, wherein the orientation sensor comprises a mercury switch for providing a first signal indicative of the horizontal display orientation, and a second signal indicative of the vertical display orientation.

34. The UPS system according to claim 25, further comprising a support carried by the housing for supporting the housing in a stable orientation, the support movable from a stored position to an extended position.

* * * * *

UNITED STATES PATENT AND TRADEMARK OFFICE
CERTIFICATE OF CORRECTION

PATENT NO. : 5,995,400
DATED : November 30, 19999
INVENTOR(S) : John N. Park, et. al.

It is certified that error appears in the above-identified patent and that said Letters Patent is hereby corrected as shown below:

Title page, item [75], inventors: delete "Orladno" and insert --Orlando--.

Signed and Sealed this

Twenty-seventh Day of June, 2000

Attest:

Q. TODD DICKINSON

*Attesting Officer*　　　　　　　　　*Director of Patents and Trademarks*